United States Patent [19]

Little

[11] Patent Number: 5,544,522
[45] Date of Patent: Aug. 13, 1996

[54] STEERING ASSEMBLY AND METHOD

[75] Inventor: Scott C. Little, Chilhowie, Va.

[73] Assignee: TRW Inc., Lyndhurst, Ohio

[21] Appl. No.: 330,986

[22] Filed: Oct. 28, 1994

[51] Int. Cl.⁶ .............................. G01M 19/00; B62D 5/22
[52] U.S. Cl. .............................. 73/118.1; 180/428; 33/600
[58] Field of Search ..................... 180/148, 79, DIG. 17, 180/DIG. 18; 73/118.1; 33/600, 606, 612

[56] References Cited

U.S. PATENT DOCUMENTS

| | | | |
|---|---|---|---|
| 3,338,140 | 8/1967 | Sheesley | 92/5 R |
| 3,875,667 | 4/1975 | Wilke | 33/533 |
| 4,449,601 | 5/1984 | Adams | 180/148 |
| 4,619,155 | 10/1986 | Futaba | 74/498 |
| 4,783,626 | 11/1988 | Shimizu | 180/79.1 X |

Primary Examiner—Eric D. Culbreth
Assistant Examiner—F. Zeender
Attorney, Agent, or Firm—Tarolli, Sundheim, Cavell, Tummino & Szabo

[57] ABSTRACT

A steering assembly (10) for use in turning steerable vehicle wheels includes a rack (12) and a pinion (14). A yoke (28) is continuously pressed against the rack (12) by a yoke spring (32). The yoke (28) has a stem (62) which extends through an opening (64) in a housing (16). During construction of the steering assembly (10), a desired range of transverse movement between the rack (112) and the pinion (14) is obtained by applying force (114) to the rack to position the rack at a first end of the range of transverse movement. The direction of the force applied to the rack (12) is then reversed and the rack and yoke (28) are moved together away from the reference position until the yoke stem (62) has moved through the desired range of transverse movement. A yoke plug (20) is then fixed against movement relative to a main housing section (18). After the rack and pinion steering assembly (10) has been constructed, it may be desired to check the range of transverse movement between the rack (12) and pinion (14). The distance between opposite ends of the range of transverse movement is determined by determining the distance through which the stem (62) on the yoke (28) moves relative to the housing (16).

19 Claims, 4 Drawing Sheets

STEERING ASSEMBLY AND METHOD

BACKGROUND OF THE INVENTION

The present invention relates to a new and improved steering assembly for use in turning steerable vehicle wheels and, more specifically, to a rack and pinion steering assembly which enables a desired range of transverse movement between a rack and pinion to be easily obtained during construction of the steering assembly and to be easily checked after construction of the steering assembly.

A known rack and pinion steering assembly includes a rack which is disposed in meshing engagement with a pinion. A housing encloses the rack and pinion. A yoke presses the rack toward the pinion to obtain firm meshing engagement between teeth on the rack and teeth on the pinion. The steering assembly may be associated with a fluid motor and have a construction similar to the construction disclosed in U.S. Pat. Nos. 4,276,812; 5,213,174; and 5,213,175.

During construction of a rack and pinion steering assembly, a range of transverse movement between a rack and a pinion in the steering assembly has previously been determined by screwing a yoke plug down against a yoke to press the rack against the pinion. The yoke plug is then unscrewed through a predetermined number of revolutions and locked in place.

The extent of the range of transverse movement between the rack and pinion is then checked by applying a force to the rack to move it toward the pinion and one end of its range of transverse movement. An oppositely directed force is then applied to the rack to move it away from the pinion to the opposite end of its range of transverse movement. The distance through which an end of the rack moves is measured. This distance is a function of the distance through which the rack moves transversely to the pinion at the location where the rack and pinion are disposed in meshing engagement.

SUMMARY OF THE INVENTION

The present invention relates to a new and improved rack and pinion type steering assembly which facilitates obtaining a desired range of movement between the rack and pinion in a direction transverse to the longitudinal axis of the rack during construction of the steering assembly. The steering assembly also facilitates subsequent inspection to determine the range of transverse movement between the rack and pinion. The steering assembly includes a yoke which is disposed in engagement with the rack and has a stem which extends through an opening in a housing to indicate the position of the rack relative to the housing.

When the improved rack and pinion steering assembly is to be constructed, the desired range of transverse movement between the rack and the pinion is obtained by moving the rack and yoke away from a first end of the range of transverse movement of the rack relative to the pinion. As the rack and yoke move away from the first end of the range of transverse movement, the distance through which they move is measured. When the rack and yoke have moved through a distance which is equal to the desired range of transverse movement between the rack and pinion, further movement in a direction transverse to the longitudinal axis of the rack is blocked.

When the range of transverse movement between the rack and pinion is to be subsequently checked, the rack is moved from a first end of the range of transverse movement between the rack and pinion to a second end of the range of transverse movement. The distance which the yoke moves as the rack is moved between the two ends of the range of transverse movement of the rack is measured to determine the extent of the range of transverse movement of the rack.

BRIEF DESCRIPTION OF THE DRAWINGS

The foregoing and other features of the present invention will become apparent to those skilled in the art upon consideration of the following description of the invention with reference to the accompanying drawings, wherein.

DESCRIPTION OF PREFERRED EMBODIMENT

Figure 1:
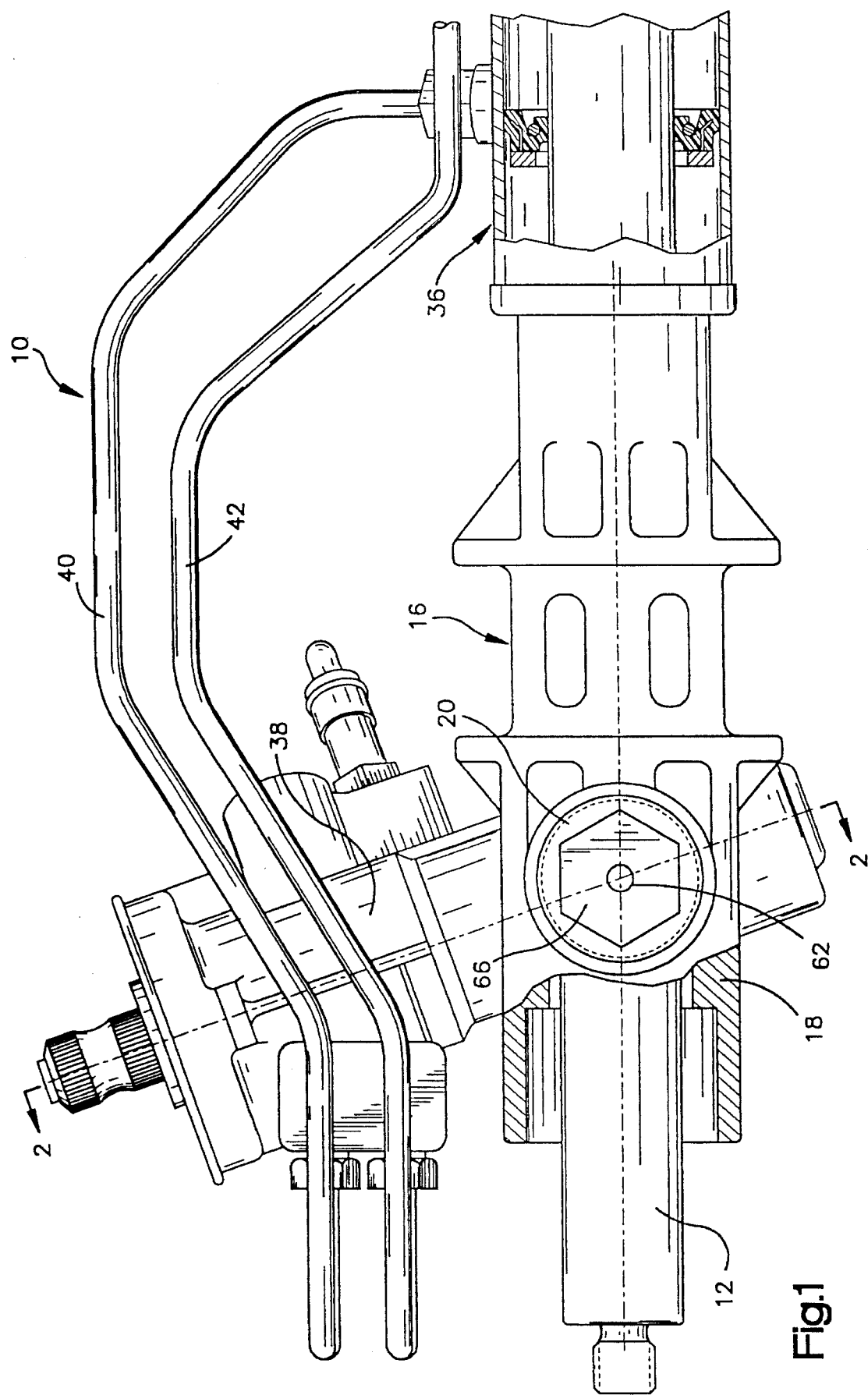
FIG. 1 is a fragmentary illustration of a rack and pinion steering assembly constructed in accordance with the present invention.

A rack and pinion steering assembly 10 (FIGS. 1 and 2) includes a rack 12. Opposite ends of the rack 12 are adapted to be connected with steerable vehicle wheels. A pinion 14 (FIG. 2) is disposed in meshing engagement with the rack 12. A housing 16 encloses the rack 12 and pinion 14. The housing 10 includes a cast main section 18 and a circular yoke plug 20 having external threads 22 which engage internal threads 24 on the main section 18 of the housing.

An improved yoke 28 is disposed in a cylindrical yoke chamber 30 in the main housing section 18. The yoke plug 20 closes the upper (as viewed in FIG. 2) end of the yoke chamber 30. A helical coil spring 32 is disposed between the yoke 28 and the yoke plug 20 and presses the yoke firmly against the rack 12.

Figure 2:
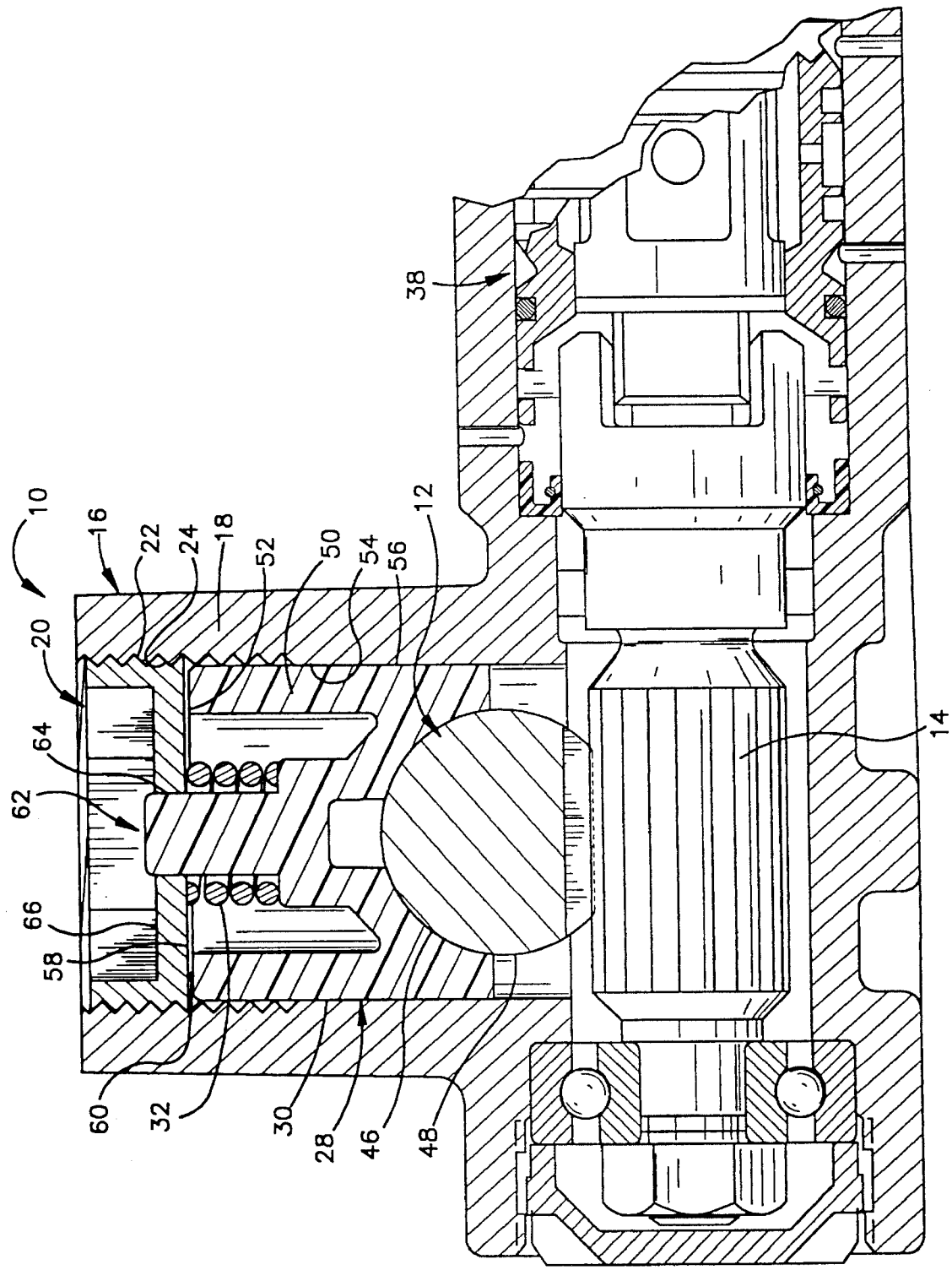
FIG. 2 is a sectional view, taken generally along the line 2—2 of FIG. 1, further illustrating the construction of the rack and pinion steering assembly of FIG. 1.

In the illustrated embodiment of the rack and pinion steering assembly 10, a fluid motor 36 (FIG. 1) is connected with the rack 12 to assist in turning steerable vehicle wheels. A steering control valve assembly 38 (FIGS. 1 and 2) is connected with the pinion 14 and with a steering wheel of the vehicle. Rotation of the steering wheel of the vehicle actuates the steering control valve assembly 38 to direct fluid flow to and from the fluid motor 36 through conduits 40 and 42 (FIG. 1).

The rack and pinion steering assembly 10 has the same general construction and mode of operation disclosed in U.S. Pat. Nos. 4,276,812; 5,213,174; and 5,213,175. Although the fluid motor 36 is provided to assist in turning steerable vehicle wheels, it is contemplated that the rack and pinion steering assembly 10 could be manually actuated or could use an electric motor to assist in turning the steerable vehicle wheels.

The yoke 28 (FIG. 2) has an arcuate inner side surface 46 which forms a portion of a cylinder and engages correspondingly shaped arcuate outer side surfaces 48 on the rack 12. The yoke spring 32 presses the arcuate inner side surface 46 on the yoke against the outer side surface 48 of the rack. The yoke has a cylindrical side wall 50 which extends axially upward (as viewed in FIG. 2) from the arcuate inner side surface 46 of the yoke. The cylindrical side wall 50 has an annular upper end surface 52. The cylindrical side wall 50 of the yoke has a cylindrical outer side surface 54 which is disposed in engagement with a cylindrical inner side surface 56 of the main housing section 18.

The yoke plug 20 has a flat circular inner side surface 58 which faces toward the annular end surface 52 on the yoke 28. A variable size gap 60 is formed between the inner side surface 58 on the yoke plug 20 and the end surface 52 on the yoke 28. The size of the gap 60 will vary as a function of the transverse position of the rack 12 relative to the pinion 14 and housing 16.

Upon actuation of the rack and pinion steering assembly 10 to turn steerable vehicle wheels, force between teeth on the rack 12 and pinion 14 move the rack upward (as viewed in FIG. 2) in a direction transverse to a longitudinal central axis of the rack. This upward movement of the rack 12 presses the end surface 52 on the yoke 28 against the inner side surface 58 on the yoke plug 20.

A range of movement of the rack 12 relative to the pinion 14 in a direction transverse to the longitudinal central axis of the rack, has a lower end (as viewed in FIG. 2) which is determined by the maximum possible extent of meshing engagement of the rack teeth with the pinion teeth and by tolerances in support bearings for the pinion. The upper end of the range of transverse movement of the rack 12 relative to the pinion 14 is determined by engagement of the end surface 52 on the yoke 28 with the inner side surface 58 on the yoke plug 20.

A cylindrical stem 62 (FIG. 2) on the yoke 28 extends through a circular opening 64 in the center of the yoke plug 20. The stem 62 is disposed in a coaxial relationship with and is partially enclosed by the cylindrical side wall 50 on the yoke 28. A longitudinal central axis of the cylindrical stem 62 extends through and is perpendicular to the longitudinal central axis of the rack 12. The central axis of the stem 62 is coincident with a central axis of the yoke plug 20. The yoke stem 62 extends outward from an outer side surface 66 of the yoke plug 20.

Since the yoke 28 is maintained in engagement with the rack 12 by the spring 32, the extent to which the stem 62 extends outward from the outer side surface 66 of the yoke plug 20 is indicative of the position of the rack 12 in the range of movement between the rack and pinion 14 in a direction transverse to the longitudinal central axis of the rack. Thus, the closer the rack 12 is to the lower end of the range of transverse movement relative to the pinion 14, the smaller is the distance which the stem 62 on the yoke 28 extends outward from the outer side surface 66 of the yoke plug 20. Similarly, the further the rack 12 is from the lower end of the range of transverse movement relative to the pinion 14, the greater is the distance which the stem 62 on the yoke 28 extends outward from the outer side surface 66 of the yoke plug 20.

Figure 3:
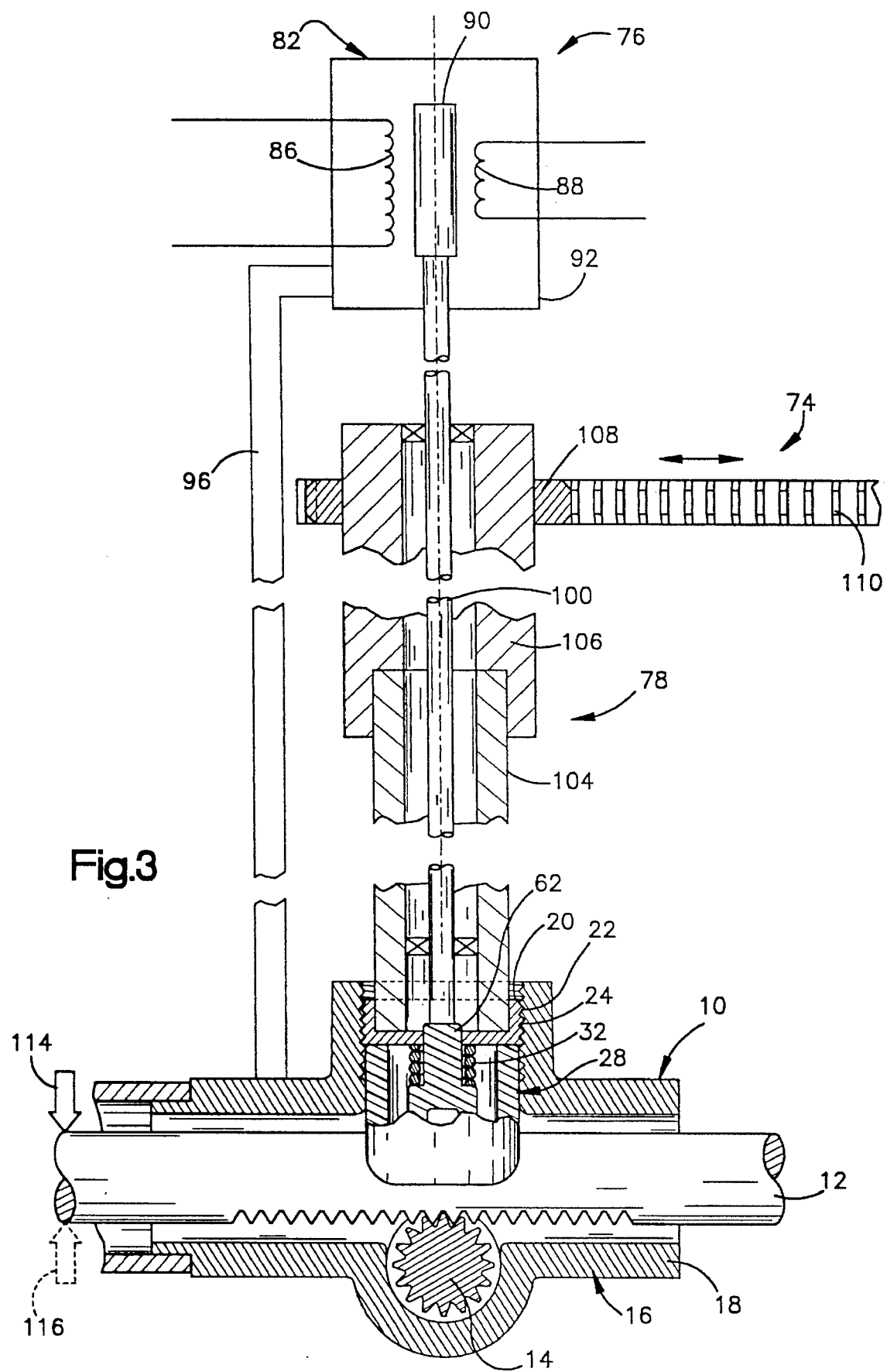
FIG. 3 is a schematic illustration depicting the manner in which a desired range of transverse movement between a rack and a pinion in the steering assembly of FIG. 1 is obtained.

An apparatus 74 for use during construction of the rack and pinion steering assembly 10 is illustrated in FIG. 3 in association with the rack and pinion steering assembly. The apparatus 74 includes a yoke position sensor assembly 76 and a yoke plug drive assembly 78. During construction of the rack and pinion steering assembly 10, the yoke position sensor assembly 76 is used to measure movement of the yoke 28 and rack 12 relative to the housing 16.

The yoke position sensor assembly 76 includes a linear voltage differential transducer (LVDT) 82. The LVDT 82 has a known construction which is illustrated schematically in FIG. 3. The LVDT includes an excitation coil 86 and a receiving coil 88. An output from the receiving coil 88 is indicative of the position of a movable armature 90 relative to a stationary housing 92 of the LVDT 82. Although it is preferred to use the LVDT 82 in the position sensor assembly 76, other known types of position sensors could be used if desired.

The stationary housing 92 of the LVDT 82 is positioned relative to the main section 18 of the housing 16 of the rack and pinion steering assembly 10 by a plurality of positioning elements 96 which engage the main section 18 of the housing 16. Although only a single positioning element 96 has been illustrated schematically in FIG. 3, it should be understood that there are at least three or more positioning elements 96 to hold the housing 92 of the LVDT stationary relative to the housing 16 of the rack and pinion steering assembly 10. The exact position of the housing 92 of the LVDT relative to the housing 16 of the rack and pinion steering assembly 10 may vary slightly depending upon the specific construction and tolerances for the main section 18 of the rack and pinion steering assembly housing. However, once the positioning elements 96 have been located in engagement with the main section 18 of the rack and pinion steering assembly housing 16, the LVDT housing 92 does not move relative to the main section of the rack and pinion steering assembly housing.

A movable sensor element or rod 100 is connected with the armature 90 and is engageable with an exposed end surface on the stem 62 of the yoke 28. Since the housing 92 of the LVDT is stationary relative to the main section 18 of the rack and pinion steering assembly housing 16, the sensor element 100 positions the armature 90 relative to the excitation coil 86 and receiving coil 88 at a location which corresponds to the extent to which the stem 62 of the yoke 28 extends from the yoke plug 20. Although it is preferred to have the movable sensor element 100 engage the exposed end surface on the stem 62 of the yoke 28, the sensor element could engage any desired surface on the yoke. For example, the sensor element 100 could extend through an opening in the yoke plug 20 and engage a surface on the yoke 28 which is enclosed by the housing 16.

The yoke plug drive assembly 78 is used to screw the yoke plug 20 into and out of the main section 18 of the housing 16. The yoke plug drive assembly 78 includes a driver 104 which engages the yoke plug 20. A drive tube 106 is connected with the upper end portion of the driver 104.

A gear 108 is fixedly connected with the drive tube 106 and transmits force from a drive belt 110 to the drive tube and driver 104. The drive belt 110 can be moved toward either the left or right to rotate the driver 104 in either a clockwise or a counterclockwise direction. Therefore, the driver 104 can be used to either screw the yoke plug 20 into the main section 18 of the rack and pinion steering assembly housing 16 or to screw the yoke plug out of the main section 18 of the rack and pinion steering assembly housing 16.

During construction of the rack and pinion steering assembly 10, the rack 12 and pinion 14 are partially enclosed by the main housing section 18. The fluid motor 36 and steering control valve 38 are interconnected by the conduits 40 and 42. Once this has been done, it is necessary to determine the range of movement between the rack 12 and pinion 14 in a direction transverse to the longitudinal axis of the rack.

When the range of transverse movement of the rack 12 relative to the pinion 14 is to be determined, the yoke plug drive assembly 78 (FIG. 3) is operated to screw the yoke plug 20 tightly into the main section 18 of the rack and pinion steering assembly housing 16. The gap 60 between the yoke plug 20 and upper end surface 52 on the wall 50 (FIG. 2) is eliminated. The arcuate inner side surface 46 on the yoke 28 is pressed firmly against the outer side surface 48 of the rack 12 by the yoke plug 20. The yoke 28 is also pressed against the rack 12 by the coil spring 32.

Even though the yoke plug 20 is tightly screwed into the main section 18 of the rack and pinion steering assembly housing 16 by the yoke plug drive assembly 78, the teeth on the rack 12 and the teeth on the pinion 14 may not have been forced to a position of maximum meshing engagement. Therefore, a downward (as viewed in FIG. 3) force, indicated by the arrow 114, is applied against the rack 12 to press the rack against the pinion 14. This takes up any tolerances in the mounting for the rack 12 and pinion 14 and ensures that the rack and pinion teeth are at a position of maximum meshing engagement. When this has been done, the rack 12 will be at one end, that is, the lower end as viewed in FIG. 3, of the range of transverse movement of the rack relative to the pinion 14.

The application of the force 114 to the rack 12 may result in the formation of a slight gap 60 (FIG. 2) between the upper end surface 52 on side wall 50 of the yoke 28 and the inner side surface 58 on the yoke plug 20. However, the yoke 28 is maintained in firm abutting engagement with the rack 12 by the yoke spring 32. Once the force 114 has been applied to the rack 12 to move the rack to the lower end of its range of transverse movement relative to the pinion 14, the output from the receiving coil 88 (FIG. 3) of the LVDT 82 is indicative of a zero reference position for the yoke stem 62. At this time, the output from the LVDT also corresponds to the lower end (as viewed in FIG. 3) of the range of transverse movement of the rack 12 relative to the pinion 14.

The application of the downward force 114 against the rack 12 is then interrupted. An upward force, indicated by the dashed arrow 116 in FIG. 3, is then applied against the rack to move the rack toward the yoke plug 20. This results in the end surface 52 on the side wall 50 of the yoke 28 being pressed firmly against the inner side surface 58 on the yoke plug 20. The yoke plug drive assembly 78 is then operated to slowly unscrew the yoke plug 20 from the main section 18 of the rack and pinion steering assembly housing 16. As this occurs, the output from the receiving coil 88 indicates the distance the yoke stem 62 and the rack 12 move upward (as viewed in FIG. 2).

When the output from the receiving coil 88 of the LVDT indicates that the yoke 28 and rack 12 have moved upward through a desired distance from the lower end of the range of transverse movement of the rack 12 relative to the pinion 14, operation of the yoke plug drive assembly 78 and rotation of the yoke plug 20 are stopped. At this time, the rack 12 and yoke 28 will be in positions corresponding to the desired upper end of the range of transverse movement of the rack relative to the pinion. During movement of the rack 12 from the lower end of the range of transverse movement between the rack and pinion 14 to the upper end of the range of transverse movement between the rack and pinion, the yoke 28 is maintained in abutting engagement with the rack 12 under the influence of force transmitted to the yoke 28 from the coil spring 32 and/or from the yoke plug 20. Therefore, the distance which the yoke stem 62 and sensor element 100 move is equal to the range of transverse movement of the rack 12 relative to the pinion 14.

Once the yoke plug 20 has been positioned relative to the main section 18 of the rack and pinion steering assembly housing 16 at a location corresponding to the desired range of movement between the rack 12 and pinion 14 in a direction transverse to the longitudinal axis of the rack, the yoke plug 20 is locked against rotation relative to the main section 18 of the rack and pinion housing assembly 16. Locking the yoke plug 20 against rotation relative to the main section 18 of the rack and pinion steering assembly housing 16 blocks further movement of the yoke 28 and the rack 12 away from the lower end of the range of relative movement between the rack and pinion 14.

The yoke plug 20 is locked against rotation relative to the main section 18 of the rack and pinion steering assembly housing 16 by the use of a viscous substance which hardens after being applied to the threaded connection between the yoke plug and the main section 18 of the rack and pinion steering assembly housing 16. The viscous substance is commercially available under the trademark "LOCTITE". Of course, other viscous locking substances could be used if desired. It is also contemplated that the yoke plug 20 could be locked against rotation relative to the main section 18 of the rack and pinion steering assembly housing 16 by the use of a locknut in a manner similar to that illustrated in U.S. Pat. No. 4,449,601 or by the use of a clip or other known device.

Immediately after construction of the rack and pinion steering assembly 10 it may be desired to inspect the rack and pinion steering assembly to determine if the desired range of movement between the rack 12 and pinion 14 in a direction transverse to the longitudinal axis of the rack has been provided. After use of the rack and pinion steering assembly 10 for a period of time, it may also be desired to inspect the rack and pinion steering assembly to determine if the desired range of movement between the rack 12 and pinion 14 in a direction transverse to the longitudinal axis of the rack has been maintained. Since the stem 62 of the yoke 28 extends through the yoke plug 20, it is possible to check the range of transverse movement between the rack 12 and pinion 14 with a minimum of difficulty by the use of a yoke position sensor assembly 122 (FIG. 4).

The yoke position sensor assembly 122 (FIG. 4) includes a linear voltage differential transformer (LVDT) 124 having the same general construction as the LVDT 82 of FIG. 3. The LVDT 124 has a combined movable armature 126 and sensor element. The LVDT 124 has an output at leads 128 and 130 which indicates the position of the armature 126 relative to a housing 134 of the LVDT.

Figure 4:
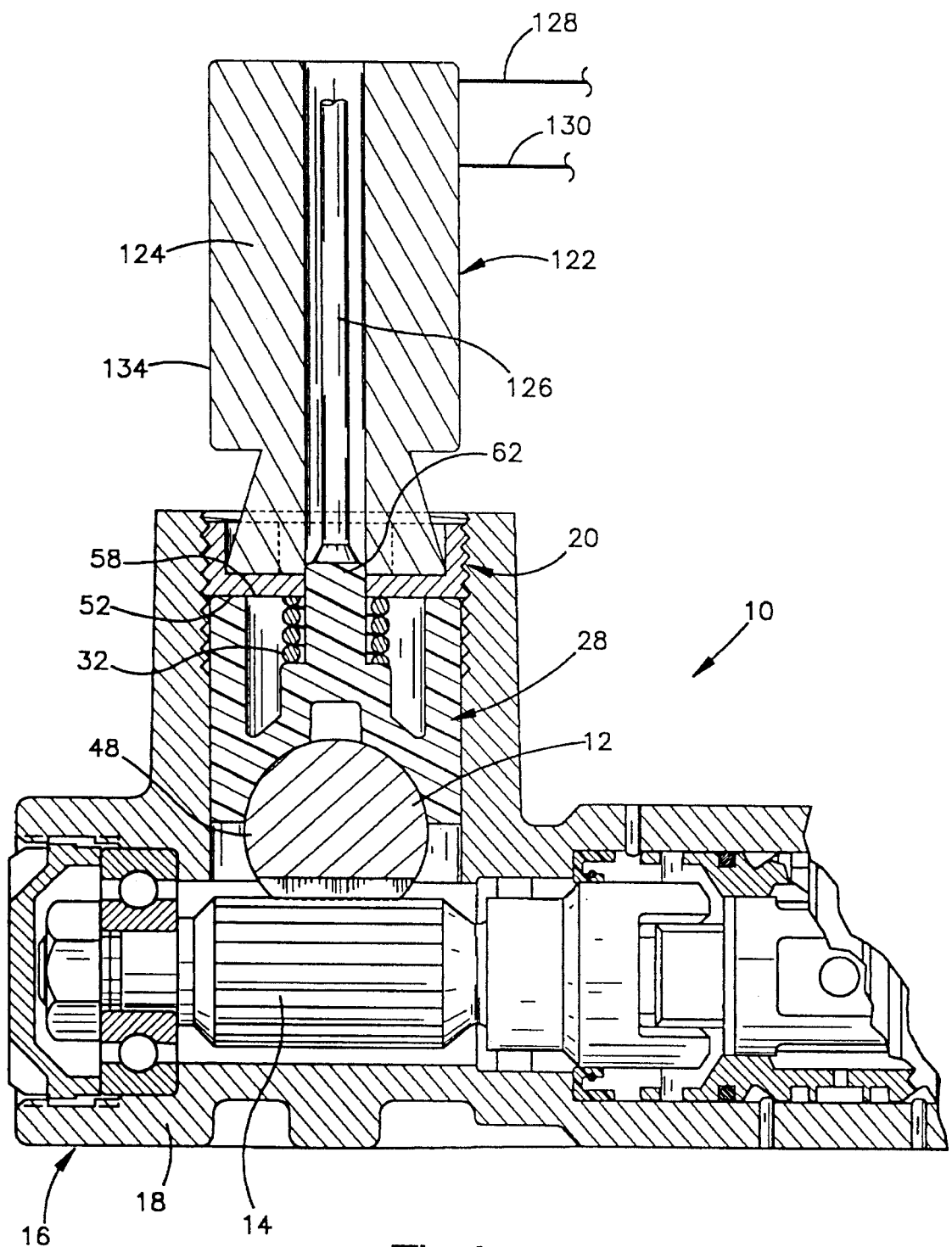
FIG. 4 is a schematic illustration depicting the manner in which the range of transverse movement between a rack and pinion in the steering assembly of FIG. 1 is checked.

When the range of movement between the rack 12 and the pinion 14 of the rack and pinion steering assembly 10 is to be measured using the yoke position sensor assembly 122, the housing 134 of the LVDT 124 is positioned in abutting engagement with the yoke plug 20 (FIG. 4). At this time, the yoke plug 20 is fixedly connected with the main section 18 of the rack and pinion steering assembly housing 16.

A downward force, corresponding to the force 114 in FIG. 3, is applied to the rack 12 to move the rack to a first or lower end of the range of transverse movement of the rack 12 relative to the pinion 14. The yoke spring 32 presses the yoke 28 firmly against the outer side surface 48 of the rack 12. Therefore, the application of the downward force to the rack 12 results in the rack, yoke 28 and armature 126 of the LVDT 124 being moved to positions which correspond to the lower end of the range of movement between the rack 12 and pinion 14 of the rack and pinion steering assembly 10 in a direction transverse to the longitudinal axis of the rack.

Once the rack 12 has been moved to the lower end of the range of transverse movement between the rack and pinion 14, the application of the downward force to the rack is interrupted. An upward force, corresponding to the force 116 in FIG. 3, is then applied against the rack 12. This results in the rack 12 being moved upward until the upper end surface 52 on the yoke 28 is in firm abutting engagement with the lower or inner side surface 58 on the yoke plug 20. At this time, the rack 12 and yoke 28 will have moved to the upper end of the range of transverse movement between the rack 12 and pinion 14.

Since the armature 126 of the LVDT 124 is moved relative to the stationary housing 134 of the LVDT by the stem 62 of the yoke 28 as the yoke and rack 12 move from the lower end of the range of transverse movement between the rack and pinion to the upper end of the range of transverse movement, the change in the output from the LVDT 124 is indicative of the distance through which the rack 12 and yoke plug 28 move between the upper and lower ends of the range of transverse movement between the rack and pinion 14.

From the above description of the invention, those skilled in the art will perceive improvements, changes and modifications. Such improvements, changes and modifications within the skill of the art are intended to be covered by the appended claims.

Having described the invention, the following is claimed:

1. A method of obtaining a desired range of movement between a rack and a pinion of a steering assembly in a direction transverse to a longitudinal axis of the rack, said method comprising the steps of:

applying force to the rack to position the rack at a first end of the desired range of movement;

pressing a yoke against the rack when the rack is at the first end of the desired range of movement to position the yoke at a first reference position;

moving the yoke away from the first reference position;

measuring the distance through which the yoke moves away from the first reference position;

interrupting movement of the yoke away from the first reference position when the measured distance is equal to the desired range of transverse movement between the rack and pinion and the yoke has moved to a second reference position for the yoke; and blocking further movement of the yoke away from the first reference position when the yoke is at the second reference position.

2. A method as set forth in claim 1 wherein said step of moving the yoke away from the first reference position includes applying force to the rack to move the rack away from the first end of the desired range of movement.

3. A method as set forth in claim 2 wherein said step of moving the yoke away from the first reference position includes pressing the yoke against the rack during movement of the yoke away from the first reference position.

4. A method as set forth in claim 1 further including detecting the position of a surface connected with the yoke relative to a housing which at least partially encloses the rack and pinon when the yoke is at the first reference position, and detecting when the position of the surface connected with the yoke has moved relative to the housing through a distance equal to the desired range of transverse movement between the rack and pinion during movement of the yoke away from the first reference position.

5. A method as set forth in claim 1 wherein said step of blocking further movement of the yoke away from the first reference position when the yoke is at the second reference position includes securing a yoke plug against movement relative to a housing which at least partially encloses the rack and pinion.

6. A method as set forth in claim 1 further including the step of pressing a surface area on the yoke against a surface area on a yoke plug and moving the yoke plug in a direction away from the first reference position during performance of said step of moving the yoke away from the first reference position.

7. A method as set forth in claim 1 further including the steps of rotating a yoke plug in a first direction relative to a housing which at least partially encloses the rack and pinion with a thread convolution on the yoke plug in engagement with a thread convolution on the housing to move the yoke plug toward the first reference position, rotating the yoke plug in a second direction opposite to the first direction during movement of the yoke away from the first reference position, pressing a surface on the yoke against a surface on the yoke plug during rotation of the yoke plug in the second direction and movement of the yoke away from the first reference position, and interrupting rotation of the yoke plug in the second direction upon movement of the yoke away from the first reference position through a distance which is equal to the desired range of transverse movement between the rack and pinion.

8. A method as set forth in claim 1 wherein said step of measuring the distance through which the yoke moves away from the first reference position includes engaging a housing which at least partially encloses the rack and pinion with a first portion of a sensor assembly, engaging a surface connected with the yoke with a second portion of the sensor assembly when the yoke is in the first reference position, moving the second portion of the sensor assembly relative to the first portion of the sensor assembly during movement of the yoke away from the first reference position, providing an output from the sensor assembly upon movement of the second portion of the sensor assembly relative to the first portion of the sensor assembly, and interrupting movement of the yoke away from the first reference position upon movement of the second portion of the sensor assembly relative to the first portion of the sensor assembly through a distance which is equal to the desired range of transverse movement between the rack and pinion.

9. A method as set forth in claim 8 wherein said step of moving the second portion of the sensor assembly relative to the first portion of the sensor assembly is performed with the surface connected with the yoke in engagement with the second portion of the sensor assembly.

10. A method as set forth in claim 1 further including positioning a yoke plug relative to a housing which at least partially encloses the rack and pinion with a stem portion of the yoke extending through an opening in the yoke plug, said step of moving the yoke away from the first reference position includes moving the yoke and the yoke plug together in a direction away from the first reference position with the stem portion of the yoke extending through the opening in the yoke plug.

11. A method of determining the range of movement between a rack and a pinion of a steering assembly in a direction transverse to a longitudinal axis of the rack, said method comprising the steps of:

applying force to the rack to position the rack at a first end of the range of movement;

pressing a yoke against the rack when the rack is at the first end of the range of movement to position the yoke at a first reference position;

moving the rack away from the first end of the range of movement to a second end of the range of movement;

pressing the yoke against the rack when the rack is at the second end of the range of movement to position the yoke in a second reference position; and measuring the extent of movement of the yoke between the first and second reference positions to determine the distance which the rack moves between the first and second ends of the range of movement.

12. A method as set forth in claim 11 wherein said step of applying force to the rack to position the rack at a first end of the range of movement includes applying the force to the rack in a first direction, said step of moving the rack away from the first end of the range of movement to a second end of the range of movement includes applying force in a second direction to the rack.

13. A method as set forth in claim 11 further including the step of pressing the yoke against the rack during movement of the rack away from the first end of the range of movement to the second end of the range of movement.

14. A method as set forth in claim 11 further including the step of interrupting movement of the rack away from the first end of the range of movement by pressing the yoke against a surface connected with a housing which at least partially encloses the rack and pinion when the rack reaches the second end of the range of movement.

15. A method as set forth in claim 11 further including engaging a housing which at least partially encloses the rack and pinion with a first portion of a sensor assembly and engaging a surface connected with the yoke with a second portion of the sensor assembly when the yoke is at the first reference position, and moving the second portion of the sensor assembly relative to the first portion of the sensor assembly during movement of the yoke away from the first reference position to the second reference position, said step of measuring the extent of movement of the yoke between the first and second reference positions including determining the distance which the second portion of the sensor assembly moves relative to the first portion of the sensor assembly during movement of the yoke from the first reference position to the second reference position.

16. A method as set forth in claim 11 wherein said step of moving the rack away from the first end of the range of movement to a second end of the range of movement includes moving a stem portion of the yoke relative to a yoke plug from a first position in which the stem portion of the yoke projects a first distance outward from an outer side surface of the yoke plug to a second position in which the stem portion of the yoke projects a second distance outward from an outer side surface of the yoke plug, said step of measuring the extent of movement of the yoke between the first and second reference positions of the yoke includes determining the difference between the first distance which the stem portion of the yoke projects outward from the yoke plug and the second distance which the stem portion of the yoke projects outward from the plug.

17. A method comprising the steps of:

engaging a rack of a rack and pinion steering assembly with a yoke;

moving the rack from a first end of a range of transverse movement of the rack relative to the pinion to a second end of the range of transverse movement of the rack relative to the pinion with the yoke in engagement with the rack; and measuring the distance through which the yoke moves during movement of the rack from the first end of the range of transverse movement of the rack relative to the pinion to the second end of the range of transverse movement of the rack relative to the pinion.

18. A method as set forth in claim 17 wherein the yoke has a stem portion which extends through an opening in a housing which at least partially encloses the rack and pinion, said step of measuring the distance through which the yoke moves during movement of the rack from the first end of the range of transverse movement of the rack relative to the pinion to the second end of the range of transverse movement of the rack relative to the pinion includes measuring the distance through which the stem portion of the yoke moves relative to the housing.

19. A method as set forth in claim 18 wherein said step of measuring the distance through which the stem portion of the yoke moves relative to the housing includes engaging the housing with a first portion of a sensor assembly, engaging the stem portion of the yoke with a second portion of the sensor assembly, and moving the second portion of the sensor assembly relative to the first portion of the sensor assembly during movement of the rack from the first end of the range of transverse movement of the rack relative to the pinion and the second end of the range of transverse movement of the rack relative to the pinion.

* * * * *